United States Patent [19]
Duncan et al.

[11] Patent Number: 5,368,384
[45] Date of Patent: Nov. 29, 1994

[54] HAND-HELD MIXING DEVICE WITH HEATING ELEMENT

[76] Inventors: J. Kenneth Duncan, 34855 Lakeview Dr., Solon, Ohio 44139; Mark Cartellone, 3566 Spencer Rd., Rocky River, Ohio 44116; Dov Glucksman, 137 Larch Row, Wenham, Mass. 01984

[21] Appl. No.: 109,641

[22] Filed: Aug. 20, 1993

[51] Int. Cl.$^5$ .............................. B01F 15/06
[52] U.S. Cl. ........................ 366/129; 366/145; 366/146; 366/601; 219/227; 219/523; 416/95
[58] Field of Search ............... 366/129, 130, 144–147, 366/197, 344, 601; 219/227, 228, 201, 241, 523, 533; 416/63, 95

[56] References Cited

U.S. PATENT DOCUMENTS

| | | |
|---|---|---|
| 1,227,935 | 5/1917 | Robertson . |
| 1,491,991 | 4/1924 | Lacy et al. . |
| 1,559,002 | 10/1925 | Plastino . |
| 1,567,679 | 12/1925 | Rittman et al. . |
| 1,702,512 | 2/1929 | Karlson . |
| 1,885,253 | 11/1932 | Gonsett . |
| 1,946,840 | 2/1934 | Cox ............................ 219/201 X |
| 2,805,050 | 9/1957 | Chappinet ..................... 366/129 X |
| 2,843,169 | 7/1958 | Stein ............................ 366/144 X |
| 3,109,913 | 11/1963 | Galajda, Jr. . |
| 3,299,924 | 1/1967 | Hanschitz ..................... 366/129 X |
| 3,586,819 | 4/1969 | Cairelli . |
| 3,589,834 | 6/1971 | Cairelli ........................ 416/95 |
| 3,635,147 | 1/1972 | Lee . |
| 4,702,608 | 10/1987 | Garbar et al. . |
| 4,850,699 | 7/1989 | Rebordosa . |
| 4,993,593 | 2/1991 | Fabiano et al. . |

*Primary Examiner*—David A. Scherbel
*Assistant Examiner*—Charles Cooley
*Attorney, Agent, or Firm*—D. Peter Hochberg; Mark Kusner; Michael Jaffe

[57] ABSTRACT

A hand-held mixing device comprising an electric motor, an elongated shaft extending from the motor, a housing enclosing the motor and a major portion of the shaft, a blade at the free end of the shaft, a heating element extending from the housing, the heating element formed to have at least one coil surrounding the blade, the coil being dimensioned to be spaced from the outer edge of the blade and to form a generally annular gap thereabout. The motor and heating element are electrically connectable to an electrical power source wherein the electrical power to the motor and to the heating element are independently controllable.

26 Claims, 9 Drawing Sheets

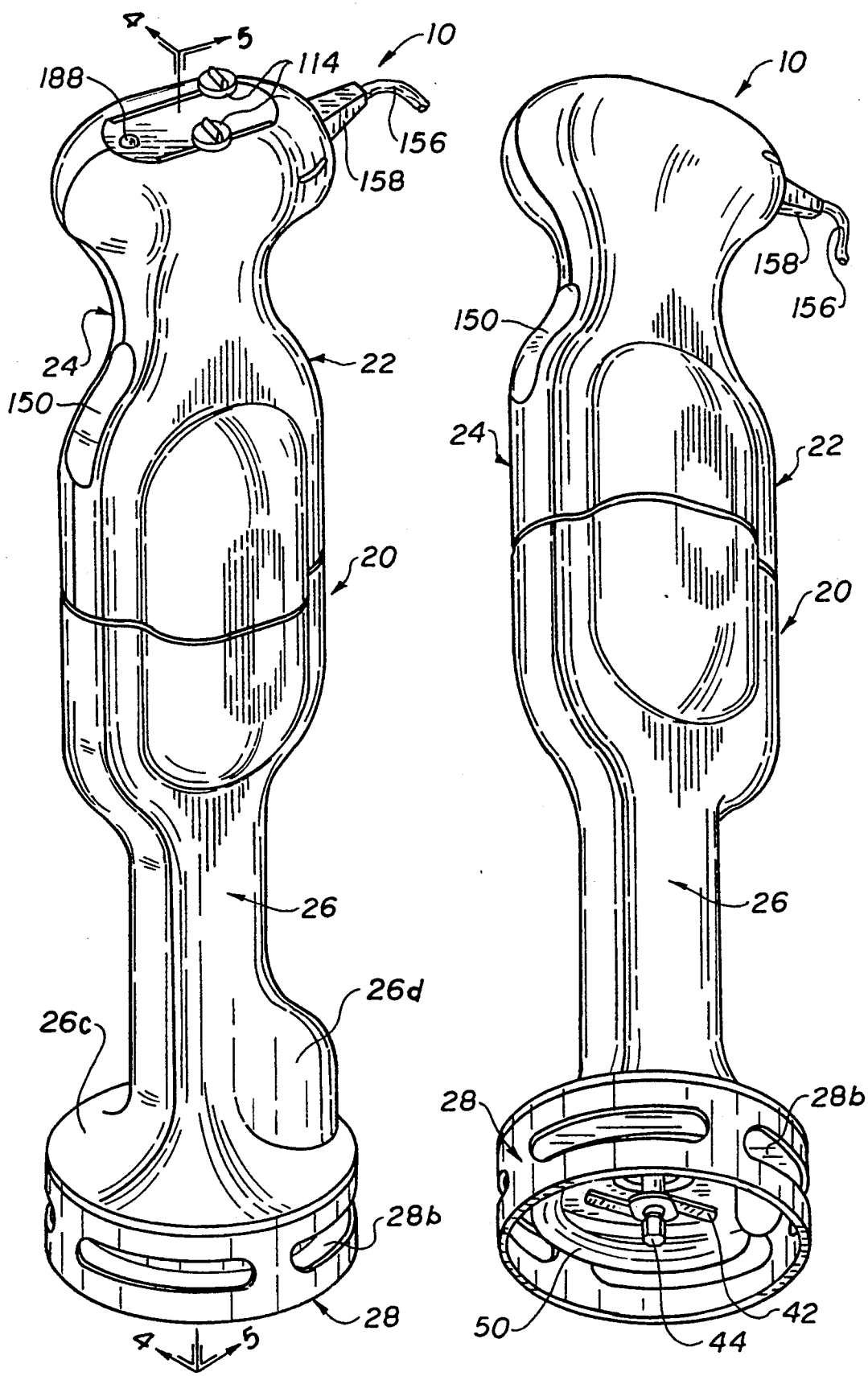

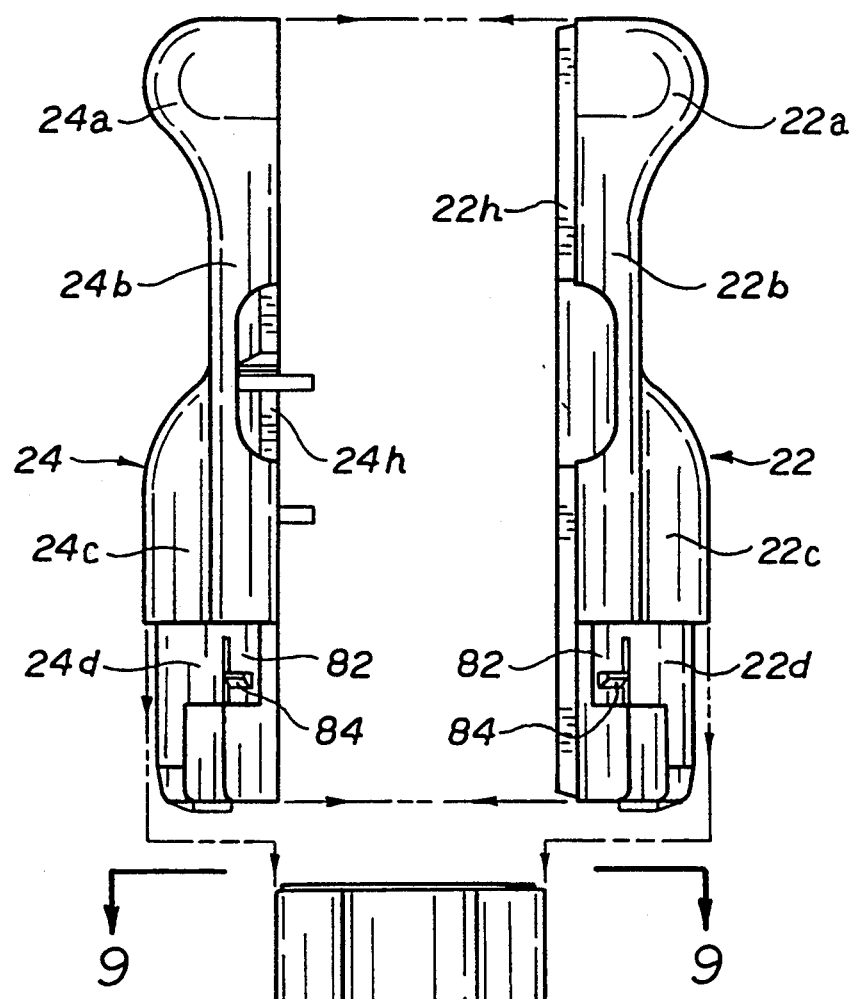
FIG. 3
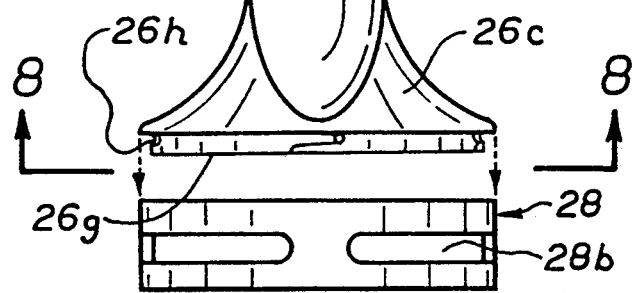

HAND-HELD MIXING DEVICE WITH HEATING ELEMENT

FIELD OF THE INVENTION

The present invention relates generally to food mixing devices, and more particularly, to a hand-held mixing device having heating means combined therewith to enable the simultaneous mixing and heating of food.

BACKGROUND OF THE INVENTION

Numerous devices are available for mixing, stirring or blending foods. For example, beater mixers and blenders have long been known and can be found in many homes and restaurants. More recently, hand-held mixers, commonly referred to as "stick-blenders" have become increasingly popular in both domestic and commercial use due to their size, weight and versatility. Mixing devices of the foregoing type find advantageous application in the preparation of a wide variety of foods, such as cake batters, gravies, sauces, drinks and the like. In many applications, it is desirable to simultaneously apply heat, in some fashion, to the foods being mixed or blended. There have been proposed a number of mixing devices for domestic use which incorporate some form of heating system to warm the material being mixed. These devices, such as those disclosed in Lee U.S. Pat. No. 3,635,147 and Garbar U.S. Pat. No. 4,702,608 et al., typically include a heating element to warm a bowl or container in which the food ingredients are placed. Another device, disclosed in Cairelli U.S. Pat. No. 3,586,819, discloses a standard hand-held food mixer having beater elements surrounded by a heating element. None of the foregoing appliances, however, disclose a "stick-blender" having a heating element associated therewith, nor do they address the problem of heating thick mixtures, such as milk based sauces or gravy which have a heavy, thick consistency and which tend to burn and stick on to heating elements.

The present invention addresses these and other problems and provides a hand-held mixing device including a heating element for the simultaneous heating and mixing of food, which device includes control means for independently controlling the temperature of the heating element and the speed of the blender to minimize the likelihood of burning or scorching of food.

SUMMARY OF THE INVENTION

In accordance with the present invention there is provided a hand-held mixing device including an electric motor, an elongated shaft extending from the motor, and a housing enclosing the motor and a major portion of the shaft. Blade means are provided at the free end of the shaft to blend, chop or mix food. A heating element extends from the housing and is dimensioned to have at least one coil surrounding the blade means. The coil is dimensioned to be spaced from the outer edge of the blade means and form a generally annular gap thereabout. Means for connecting the motor and the heating element to an electrical power source are provided, together with control means for independently controlling the electrical power to the motor and to the heating element.

In accordance with another aspect of the present invention, the hand-held mixing device as described above further includes sensing means associated with the heating element to limit the temperature of the heating element.

In accordance with another aspect of the present invention there is provided a hand-held mixing device including an electric motor, an elongated shaft extending from the motor, and a housing enclosing the motor and a major portion of the shaft. Blade means are provided at the free end of the shaft to mix, chop or blend food. A heating element extends from the housing and is formed to have at least one coil surrounding the blade means. The coil is dimensioned to be spaced from the outer edge of the blade means and to form a generally annular gap therewith. Means for connecting the motor and heating element to an electrical power source are provided.

It is an object of the present invention to provide a hand-held kitchen appliance for preparation of foods, which appliance can simultaneously or independently mix and heat ingredients.

Another object of the present invention is to provide a hand-held kitchen appliance as described above wherein the mixing speed and the heating temperature of the appliance are variable.

Another object of the present invention is to provide an appliance as described above which includes a heating element formed into one or more coils surrounding the periphery of a mixing blade wherein the coil(s) of the heating element defines a mixing chamber.

These and other objects and advantages will become apparent from the following description of a preferred embodiment of the invention taken together with the accompanying drawings.

BRIEF DESCRIPTION OF THE DRAWINGS

The invention may take form in certain parts and arrangement of parts, a preferred embodiment of which will be described in detail in the specification and illustrated in the accompanying drawings wherein:

FIGS. 1 and 2 are prospective views of a hand-held mixing device illustrating a preferred embodiment of the present invention;

FIG. 3 is an exploded view of the housing of the mixing device shown in FIG. 1;

DETAILED DESCRIPTION OF PREFERRED EMBODIMENT

Figure 4A:
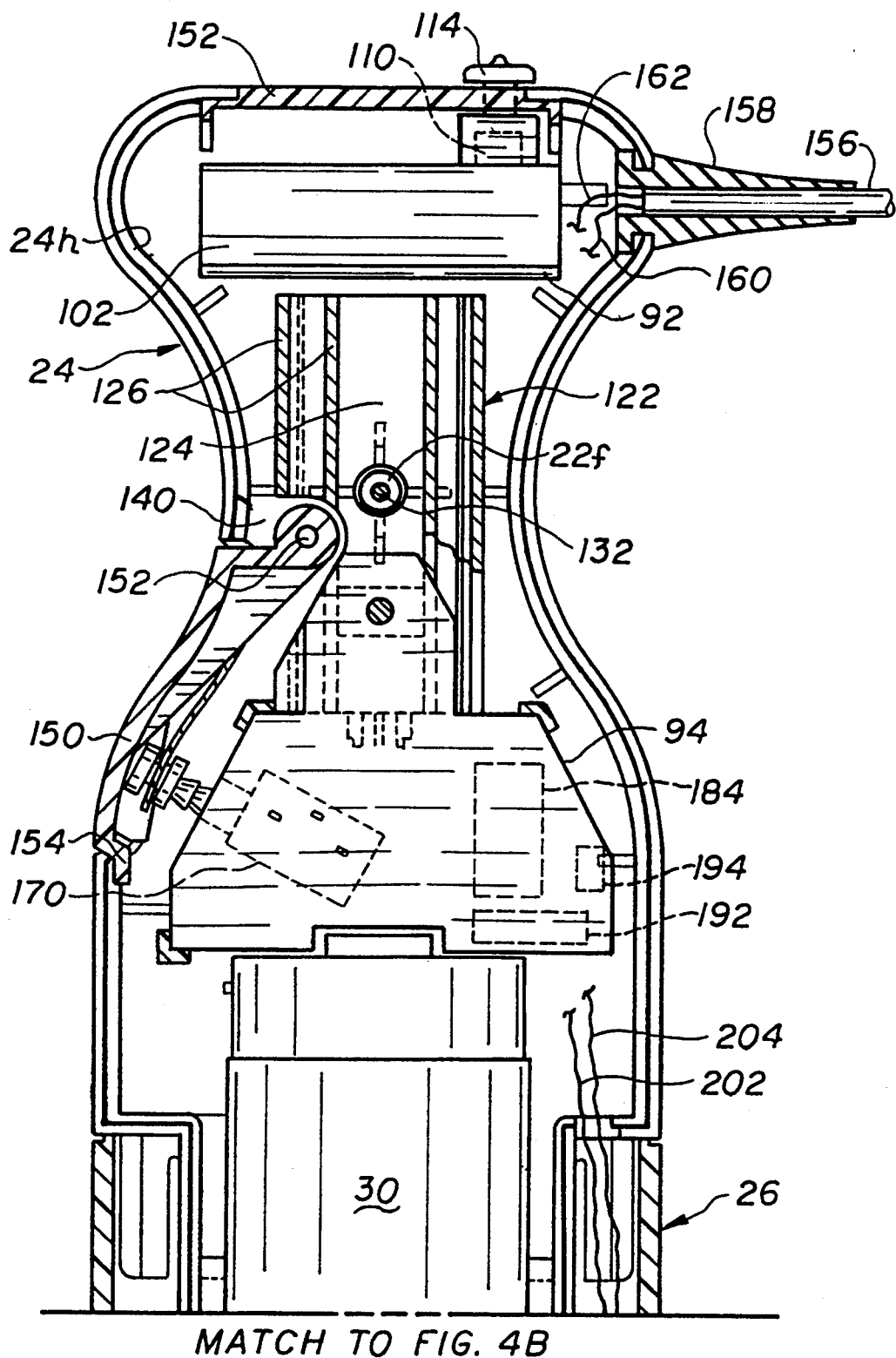
FIGS. 4A and 4B are enlarged sectional views taken along line 4—4 of FIG. 1.

Referring now to the drawings wherein the showings are for the purpose of illustrating a preferred embodiment of the invention and not for the purpose of limiting same, FIGS. 1 and 2 disclose a hand-held mixing device 10 constructed in accordance with the present invention for simultaneously mixing, chopping, blending and/or heating food or foodstuffs.

Mixing device 10 is generally elongated in shape and is formed to have an enlarged upper end, an enlarged middle section and a flared lower end, as best seen in FIGS. 1 and 2. Mixing device 10 includes a housing 20, which in the embodiment shown is generally comprised of two upper housing sections 22, 24, a lower housing section 26, and a cylindrical guard 28. Housing sections 22, 24 and 26 are dimensioned to be assembled together, as best seen in FIG. 3. The housing components are preferably formed of a high strength plastic material and molded to define the outer contours of housing 20 and further to define an internal cavity dimensioned to contain the operative components of mixing device 10.

Figure 4B:
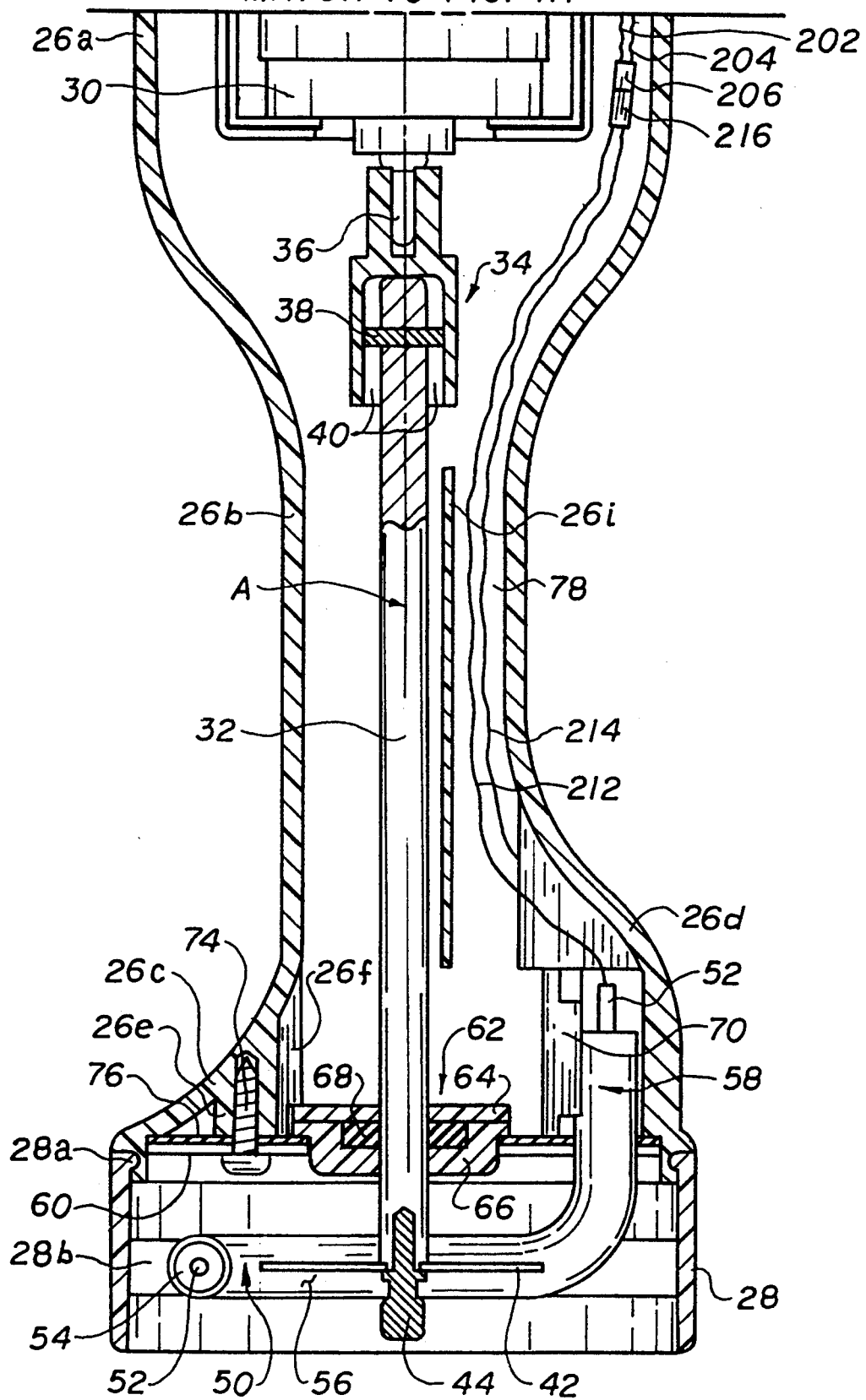

In this respect, the internal cavity defined by housing 20 is dimensioned to receive a motor 30 having a motor drive shaft 36 aligned along an axis "A" which extends longitudinally through housing 20, as best seen in FIG. 4B. A shaft 32 disposed within the housing 20 is aligned with motor drive shaft 36 along the axis "A." A coupling 34 connects the upper end of shaft 32 with motor drive shaft 36. Coupling 34 is preferable press fit onto motor drive shaft 36 for rotation therewith. As best seen in FIG. 4B, in the embodiment shown, coupling 34 includes opposed slots 40 which are dimensioned to receive a pin 38 which extends through shaft 32. The lower end of the shaft 32 includes chopping or cutting blade 42. Blade 42 is secured to shaft 32 by pin 44. In the embodiment shown pin 44 has a hexagonal head to facilitate attachment to accessories (not shown).

According to the present invention, a heating element 50 is formed into a circular loop and surrounds blade 42. In accordance with one aspect of the present invention, heating element 50 is positioned relative to blade 42 such that pin 44 extends below the lower surface of heating element 50, as best seen in FIG. 4B. In the embodiment shown, heating element 50 is circular in cross-section and is comprised of a central core element 52 surrounded by a ceramic material 54, as best seen in FIG. 5B. Ceramic 54 is encased within a tubular metallic shell 56 which is preferably formed of aluminum or stainless steel. Shaft 32 and heating element 50 extend through a flat, circular plate 60. A bearing/seal 62 is centrally positioned within plate 60 and receives the end of shaft 32 therethrough. Bearing/seal 62 is generally comprised of an upper seal housing 64 and a lower seal housing 66 which are dimensioned or otherwise formed to be secured together by means not shown. Seal housings contain a seal element 68 which is operable to form a fluid-tight seal against shaft 32. In this respect, seal element 68 is preferably formed of an elastomeric material, and seal housings 64, 66 are dimensioned to compress seal element 68 into fluid-tight engagement with shaft 32.

Heating element 50 includes end portions 58 which project upward through plate 60. End portions 58 of heating element 50 are preferably secured to plate 60 to form a fluid tight seal therewith. End portions 58 which extend above plate 60 are arranged to be side-by-side and generally parallel to each other. Heating element 50 and bearing/seal arrangement 62 are to form an integral heater/bearing assembly therewith, which assembly may be quickly assembled with lower housing section 26.

Figure 8:
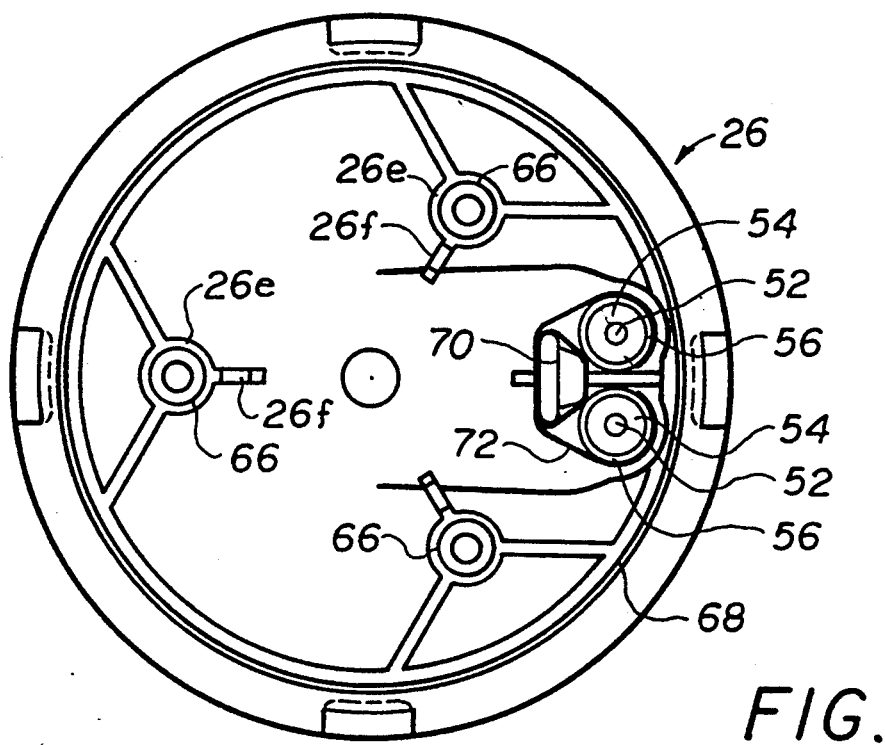
FIG. 8 is a bottom view taken along line 8—8 of FIG. 3 showing the lower end of the lower housing section.

As best seen in FIG. 8, a thermostat 70 is positioned adjacent, and in surface contact with, the exposed end portions 58 of heating element 50. A clip 72 holds thermostat 70 in position against end portions 56.

As indicated above, the respective housing sections are formed to encase the operative components of mixing device 10 and to provide mounting surfaces therefore. In this respect, lower housing section 26 has a relatively large upper portion 26a dimensioned to receive motor 30 and to receive the lower ends of upper housing sections 22, 24, as will be described in greater detail below. This upper portion 26a is contoured into a smaller generally cylindrical intermediate portion 26b which surrounds shaft 32. Lower most portion 26c of lower housing section 26 is flared outwardly and is generally circular in shape. Lower :most portion 26c preferably has an outer diameter greater than the diameter of the loop formed by heating element 50, as best seen in FIG. 4B.

To accommodate end portions 58 of heating element 50 and thermostat 70, lower housing section 26 is formed to include an enlarged portion 26d above and to one side of flared lower end 26c of lower housing section 26. A plurality of spaced-apart mounting bosses 26e, best seen in FIG. 8, are formed along the inner surface of the flared lower portion 26c. Mounting bosses 26e are provided to receive threaded fasteners 74 which attach plate 60 to the lower housing section 26. In the embodiment shown, plate 60 is generally circular in shape. A gasket 76 is provided between plate 60 and lower end of the housing section 26 to form a fluid-tight seal therewith. To enhance the seal between lower housing section 26 and gasket 76, raised ribs 66, 68, extend from the lower surface mounting bosses 26e and the periphery of lower housing section 26, respectively. Similarly, the lower surface of gasket 76 may include ribs (not shown) to enhance the seal formed between gasket 76 and plate 60. Bearing/seal 62 is maintained in position, i.e., with lower seal housing 66 in fluid-tight engagement with gasket 76, by ribs 26f which extend from mounting bosses 26e, as best seen in FIG. 8. Ribs 26f, which engage upper seal housing 64, together with plate 60, essentially clamp bearing/seal 62 against gasket 76 when the fasteners 74 secure plate 60 to lower housing section 26.

An angular lip 26g extends from the lower end of flared lower portion 26c. A circular groove 26h is formed in lip 26g. Groove 26h is dimensioned to receive an annular rib 28a which is formed along the inner surface of guard 28. In this respect, guard 28 is dimensioned to be received in snap-lock fashion onto lower housing section 26. Guard 28 is generally cylindrical in shape and includes a plurality of elongated slots which are aligned with each other such that they extend about the guard. Guard 28 is adapted to be removable from lower housing section 26 to facilitate access to blade 42 and heating element 50 for cleaning purposes. A barrier 26i is formed within lower housing section 26. Barrier 26i is positioned to one side of shaft 32 and is provided to define a channel 78 through lower housing section 26. Channel 78 is provided to receive electrical wires (212, 214) which connect heating element 50 with electric circuitry located in upper housing sections 22, 24, and to maintain such wire away from shaft 32.

Figure 5A:
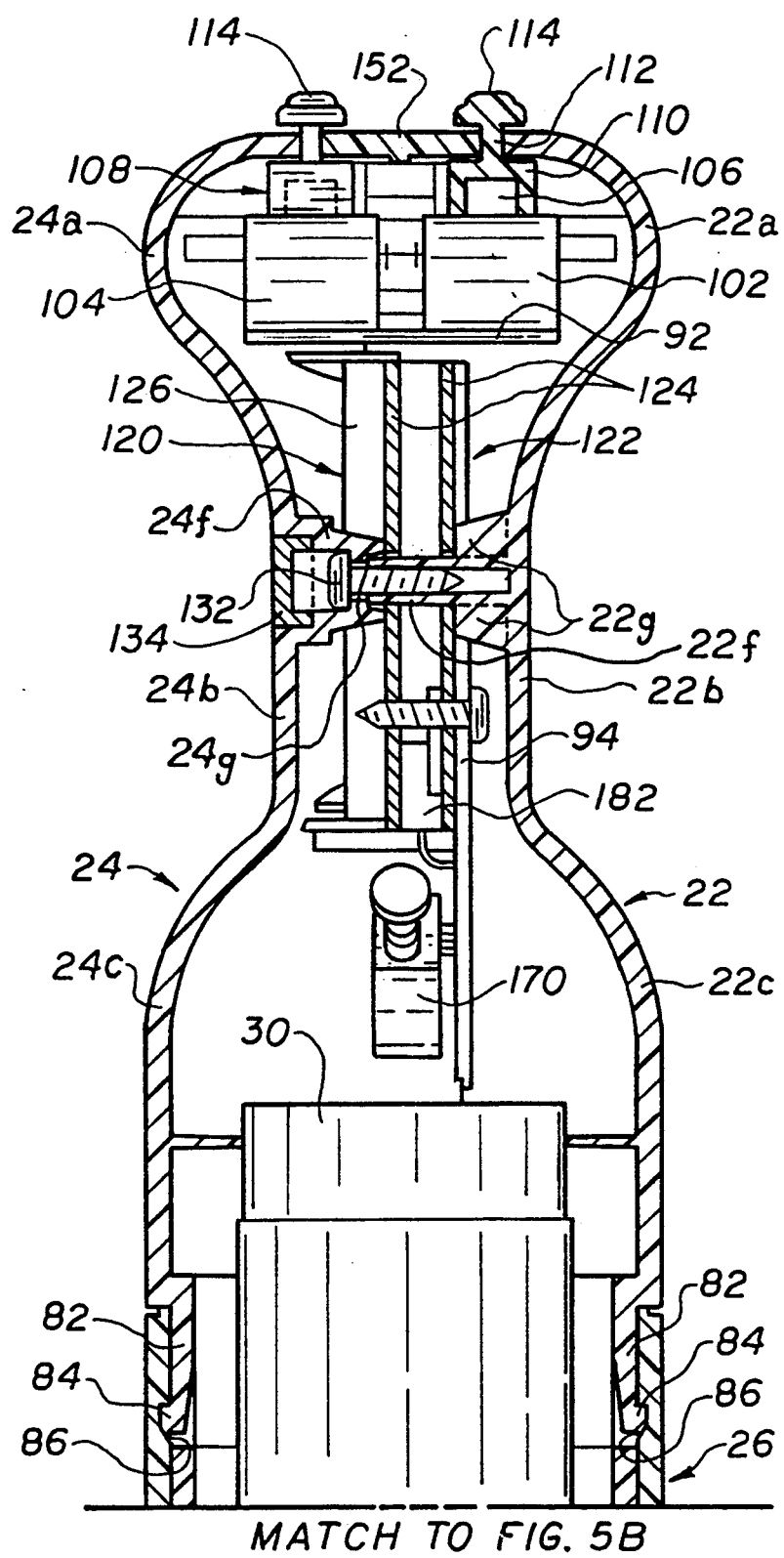
FIGS. 5A and 5B are enlarged sectional views taken along line 5—5 of FIG. 1.
Figure 5B:
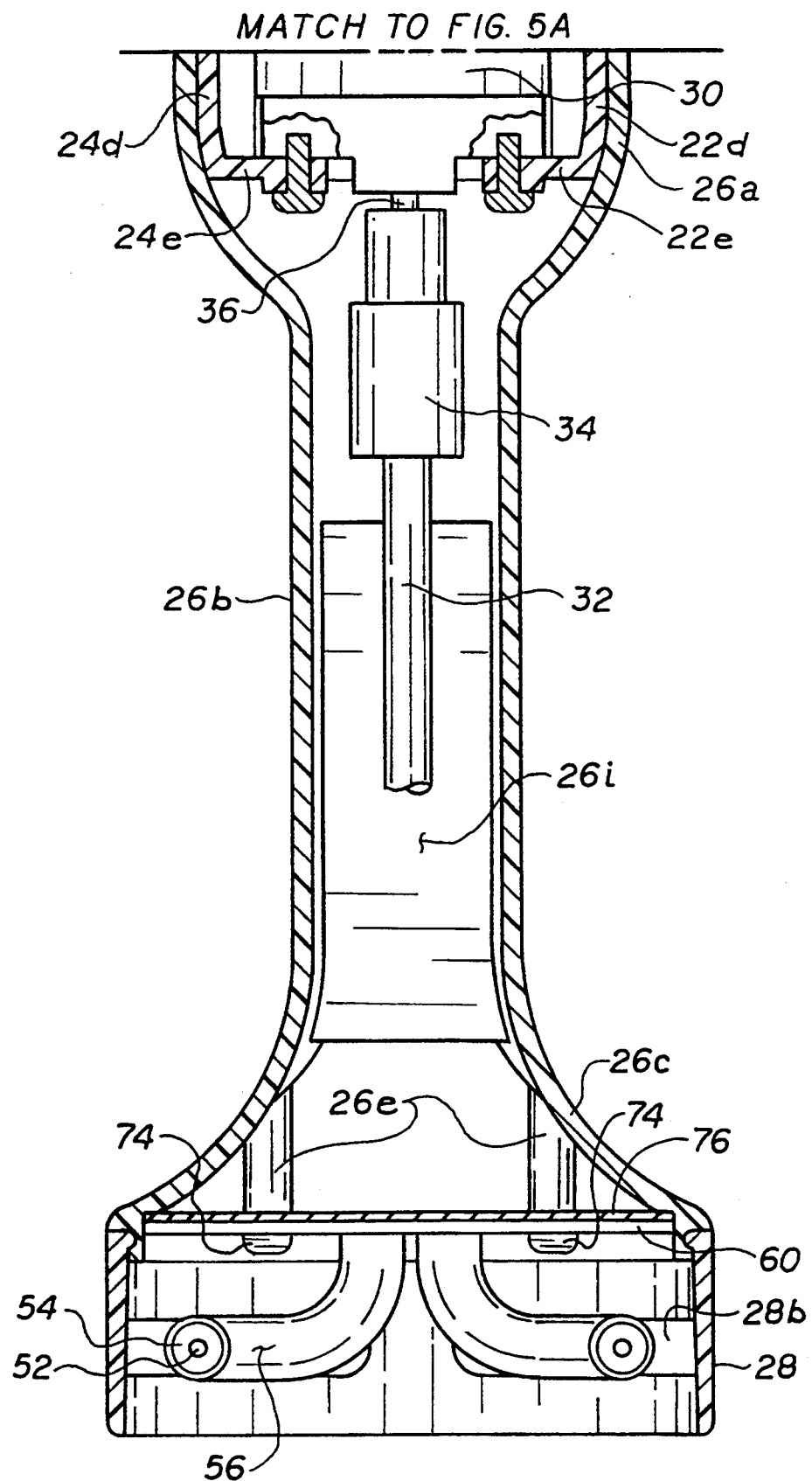
Figure 9:
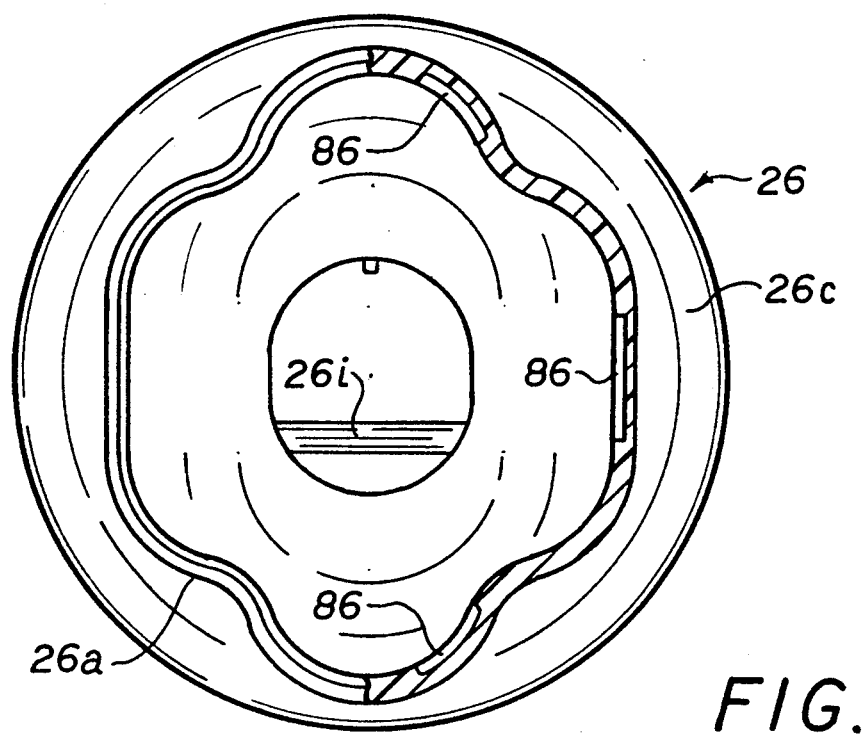
FIG. 9 is a partial broken, top view taken along line 9—9 of FIG. 3 and showing the upper end of the lower housing sectional.

Referring now to FIGS. 3, 4A and 5A, upper housing sections 22, 24 are best seen. Housing sections 22, 24 are preferably of molded plastic construction and are designed to be fastened to one other. Upper housing sections 22, 24 are each formed to have outer surfaces which are generally mirror images of each other and which define the outer contour of mixing device 10. In this respect, housings sections 22, 24 have, respectively, an enlarged upper portions 22a, 24a, a narrow neck portion 22b, 24b, and an enlarged lower portion 22c, 24c, which is dimensioned to mate with, conform to the upper portion 26a of lower housing section 26. To this end, upper housing sections 22, 24, respectively, include an extension 22d, 24d, which extend from lower portions 22c, 24c. Extensions 22d, 24d include a plurality of resilient arms 82 formed therein. Each arm 82 includes an outwardly projecting finger 84. Arms 82 are positioned to be in registry with recesses 86 (best seen in FIGS. 5A and 9) which formed are formed in the inner surface of upper portion 26a of lower housing section 26. Mounting plates 22e, 24e extend inwardly from extension 22d, 24d respectively, to support motor 30, as best seen in FIG. 5B.

Referring now to FIG. 5A, a tubular post 22f extends from the inner surface of upper housing section 22. A plurality of fins 22g extend radially outward from the base of post 22f. Post 22f is designed to align with a recessed cavity 24f formed in upper housing section 24. Cavity 24f has an aperture 24g through the bottom thereof. Cavity 24f is dimensioned to receive a self-tapping threaded fastener 132 which is to extend through aperture 24g into tubular post 22f to secure upper housing sections 22, 24 together. A cap 134 is provided to plug cavity 24f once fastener 132 is in place. To facilitate attachment and alignment of upper housing sections 22, 24, upper housing section 22 is formed to include a flange 22h (best seen in FIG. 3) along the peripheral edge thereof. Flange 22h is dimensioned to be received in a recess 24h formed along the peripheral edge of upper housing section 24.

Figure 10:
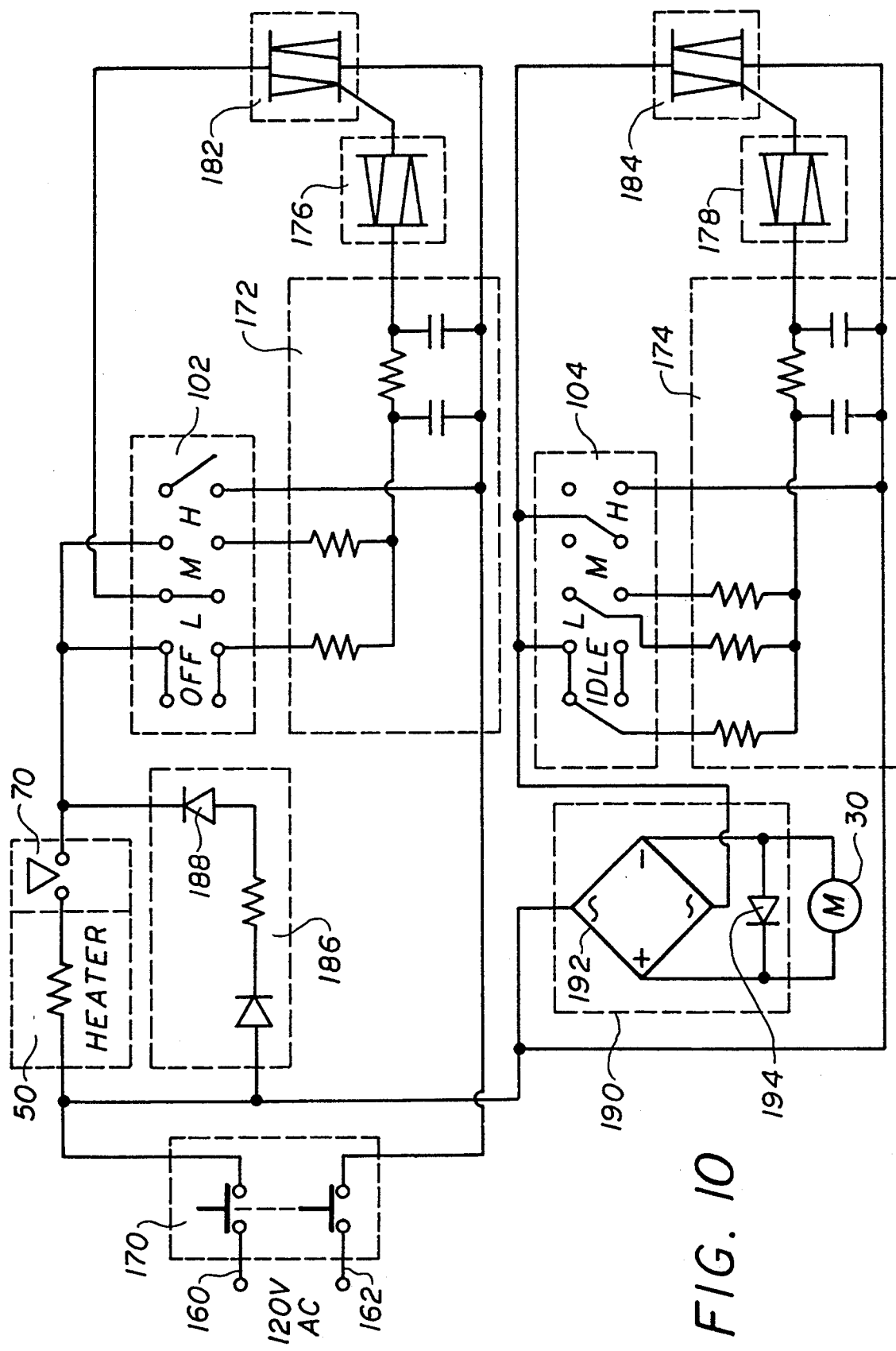
FIG. 10 is an electronic circuit diagram schematically illustrating the electronic controls of the mixing device shown in FIG. 1.

As indicated above, upper housing sections 22, 24 enclose and provide mounting surfaces for motor 30 and other operative components as will be discussed hereinafter. In the embodiment shown, electronic components are mounted on to an upper PC board 92 and a lower PC board 94, which are schematically represented in FIG. 10. Upper and lower PC boards 92, 94 are adapted to be positioned within the cavity defined by the upper housing sections 22, 24. Upper PC board 92 is generally comprised of a pair of side-by-side slide switches 102, 104. Switch 102 is provided to control heating element 50, and the switch 104 is provided to control the motor 30. In the embodiment shown, each slide switch 102, 104 is a four position switch. Slide switch 102 has an "OFF" position and 3 operational positions, designated in the drawing "L," "M" and "H" for "low," "medium" and "high," respectively. Slide switch 104 has an "IDLE" position and 3 operational positions, designated in the drawing "L," "M" and "H" for "low," "medium" and "high," respectively.

Each slide switch 102, 104 includes a movable slide element 106. In the embodiment shown an actuator 108 is provided to be positioned over slide element 106. In this respect actuator 108 includes a skirt portion 110 which is dimensioned to be positioned over, and to receive, slide element 106. A narrow neck portion 112 extends upward from skirt portion 110 and terminates in a cap 114. Locating tabs are formed on the liner surface of upper housing sections 22, 24 to position upper PC board 92, together with slide switches 102, 104, within the upper portion of the cavity defined by upper housing sections 22, 24.

Below upper PC board 92, a pair of side-by-side heat sinks 120, 122 are provided. In the embodiment shown, each heat sink 120, 122 is an aluminum extrusion having a generally planar back portion 124 with a plurality of vanes 126 extending therefrom.

A conventional fastener attaches lower PC board 94 to heat sinks 120, 122. In this respect, heat sinks 120, 122 are generally identical in shape and are positioned side-by-side within the cavity defined by upper housing sections 22, 24. A generally, centrally located cylindrical aperture is formed through heat sinks 120, 122 to receive tubular mounting post 22f therethrough. Fins 22g at the base of post 22f abut the heat sinks 120, 122 and position same against cavity 24g within the cavity defined by upper housing sections 22, 24. A notch 140 (best seen in FIG. 4A) is formed in one side of each heat sink 120, 122. Notch 140 is provided to accommodate a switch actuator 150. Switch actuator 150 has a contoured surface and is dimensioned to generally conform to the outer surface profile of upper housing sections 22, 24. Switch actuator 150 is positioned within a generally oval opening defined in housing sections 22, 24 and is mounted on pivot pin 152 which extend from one of the upper housing sections 22, 24 for rotation thereabout. A tab 154 on the lower end of switch actuator 150 limits movement thereof in an outward direction.

Figure 6:
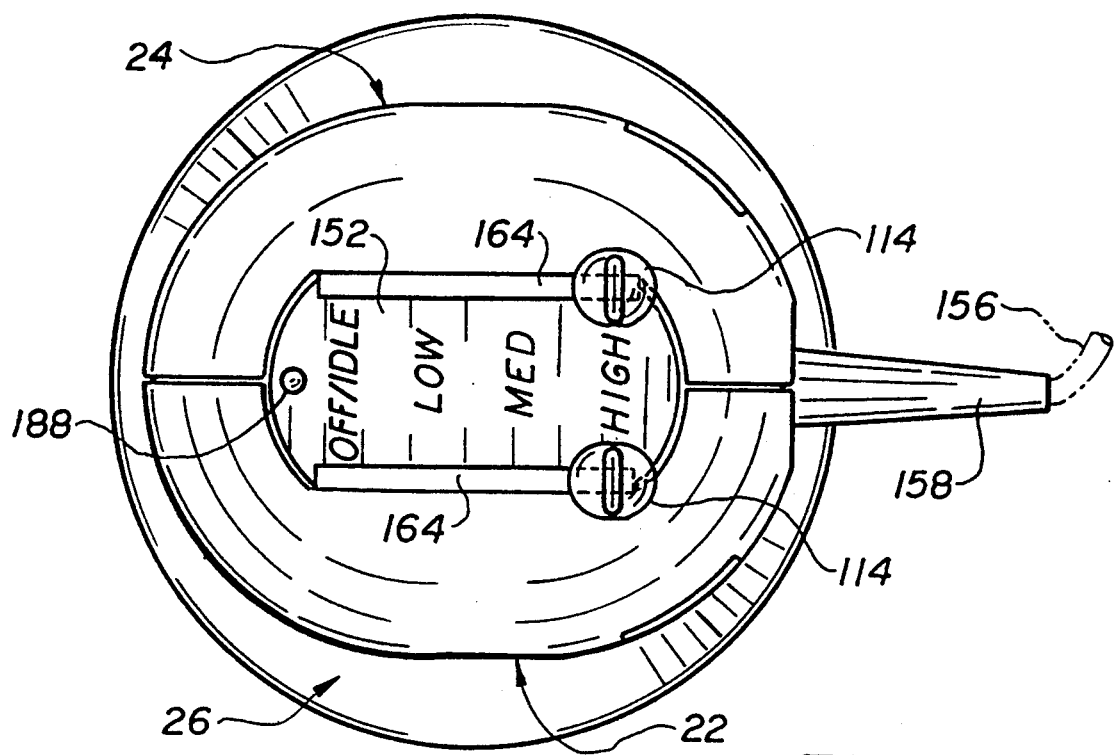
FIG. 6 is a top plan view of the mixing device shown in FIG. 1.
Figure 7:
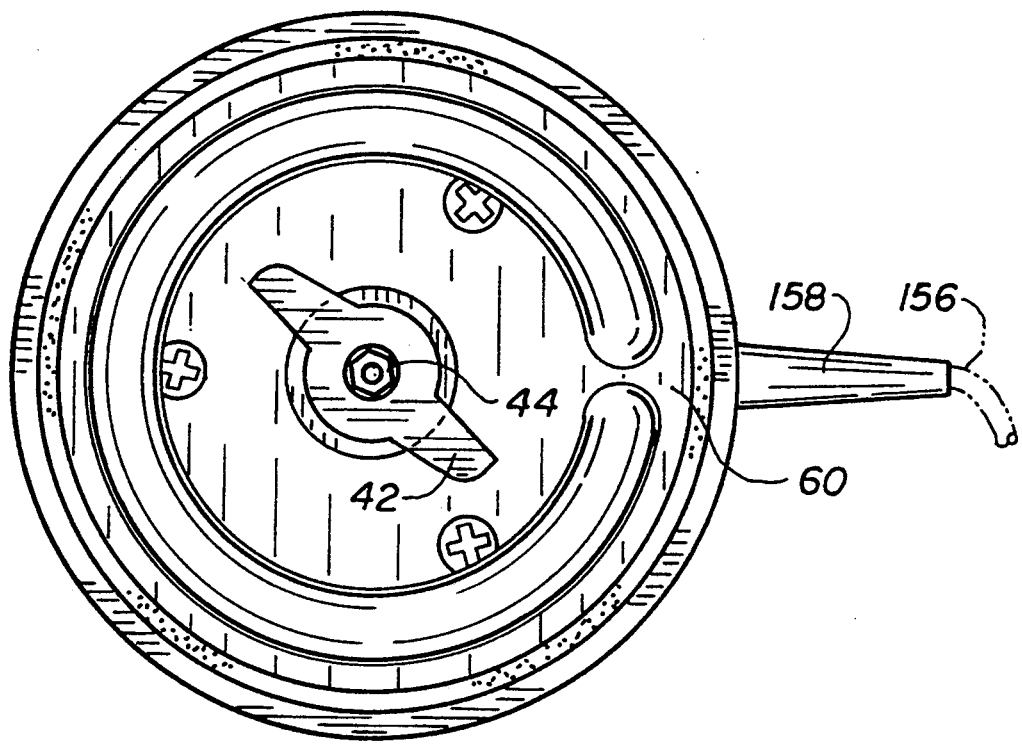
FIG. 7 is a bottom plan view of the mixing device shown in FIG. 1.

Slide switches 102, 104 are positioned to extend through a generally rectangular opening formed in the upper end of the housing sections 22, 24. An elongated, generally rectangular cover plate 152 (best seen in FIGS. 4A and 6) is positionable within the rectangular opening in upper housing sections 22, 24. The width of the cover plate is dimensioned relative to the sides of rectangular opening to define parallel slots 164 through the upper end of the housing sections. Slots 164 are dimensioned to receive neck portion 112 of actuators 108 which are mounted to slide switches 102, 104. Adjacent slide switches 102, 104 and an electric cord 156 is provided through the wall of the upper housing sections 22, 24. A strain relief gasket 158, which is received in an aperture formed by housing sections 22, 24, is provided to secure cord 156 to housing 20. Cord 156 provides a pair of electrical leads 160, 162 which attach to the electrical components as schematically illustrated in FIG. 10.

Referring now to FIG. 10, the electronic circuitry for controlling mixing device 10 is schematically shown. A double pole momentary switch 170 is provided to enable motor 30 and heating element 50. In this respect, motor 30 and heating element 50 are operable only when switch 170 is actuated. As indicated above, slide switches 102, 104 are provided to respectively control the speed of motor 30 and the wattage to heating element 50. To this end, timing circuits 172, 174 and DIACS 176, 178 and TRIACS. 182, 184 are associated with slide switches 102, 104 to vary the voltage to motor 30 and heating element 50. A light indicator circuit 186 is provided to illuminate diode 188 when power is provided to heating element 50. A rectifier and filter circuit 190 comprised of a diode bridge 192 and flyback diode 194 is provided with motor 30, as is conventionally known.

In the embodiment shown, switch 170, TRIACS 182, 184 diode bridge 192 and fly back diode 194 are mounted to lower PC board 94, and slide switch 120, 122 timing circuits 172, 174 and DIACS 176, 178 are provided on upper PC board 92.

As indicated above, the lower ends of upper housing sections 22, 24 are formed to have a sleeve-like extension 22d, 24d which have an outer profile generally mating and conforming to the inner profile of lower housing section 26. In this respect, upper housing sections 22, 24 when assembled are dimensioned such that extension 22d, 24d are matingly received within the upper end of lower housing section 26, and snap-lock into engagement therewith. In this respect, fingers 84 on tab 82, which are formed in extensions 22d, 24d, are received within recesses 86 formed in the inner surface of lower housing section 26, as best seen in FIG. 5A.

Referring now to the construction of mixing device 10, housing components 22, 24 and 26 are designed to facilitate simple, efficient, and quick assembly. To this end upper housing sections 22, 24 are designed to be assembled into an upper assembly which essentially contains motor 30 and PC board 92, 94. Lower housing section 26 is designed to have heating element 50 and shaft 32 assembled thereto to form a lower assembly.

With respect to the upper assembly, as indicated above, sections 22, 24 are dimensioned to basically contain the operative electrical components of mixing device 10. The respective components are assembled and positioned between housing sections 22, 24 as shown in FIGS. 4A and 5A. Motor 30 is mounted to mounting plates 22e, 24e of housing sections 22, 24 respectively, and coupling 34 is fixedly mounted to motor drive shaft 36 as part of the upper assembly. A pair of electrical lines 202, 204 having a conventionally-known quick connect fastener 206 at the ends thereof extend from the upper assembly (see FIGS. 4A and 4B).

Referring now to the lower assembly 26, heating element 50 is preferably brazed to plate 60 to form a fluid-tight seal therewith. Bearing seal 62 is received in a central opening in plate 60, as shown in FIG. 4B. Seal 76 forms a fluid tight seal between plate 60, bearing/seal 62 and lower housing section 26. Bearing/seal 62 is basically clamped against seal 76 and plate 60 by flange 26f which engages upper seal housing 64. Electrical lines 212, 214 are connected to the exposed ends of core element 52. The other ends of electrical lines 212, 214 include a quick connect fastener 216 for connection to fastener 206. Importantly, as seen in FIG. 4B, electrical lines 212, 214 are positioned within channel 78 defined by wall 26i, to prevent possible entanglement with shaft 32 during operation of mixing device 10.

The upper and lower assemblies are easily joined by connecting fasteners 206, 216 to each other, aligning pin 38 on shaft 32 with slots 40 in coupling 34 and inserting extensions 22d, 24d into the upper end of lower housing section 26. Fingers 84 on resilient arms 82 snap-lock into recesses 86 which are formed in the inner surface of lower housing section 26.

Referring now to the operation of the present invention, mixing device 10 is adapted for use in mixing and heating foods, such as gravies, broth and the like. With respect to heating such foods, it is generally known that certain foods tend to adhere more rapidly to hot surfaces than others, and therefore, are more likely to burn. For example, milk based foods tend to burn or scorch more rapidly than other foods. In this respect, even though milk (cow's milk) is composed of approximately 80% water, it also contains roughly 4% emulsified particles of fat and fatty acid. It is the fat particles which have a lower boiling temperature and which can be easily burned or scorched by a heating element, even when such heating element is at a temperature well below the boiling point of water. Thus, when applying heat to a foodstuff, the likelihood of burning the material generally relates to the composition of the foodstuff, and to the instantaneous heat transferred to a particle of food at the surface of the heating element. Since the composition of foods to be heated may vary with the desires of the consumer, i.e., by a recipe or the food to be prepared, to avoid burning or scorching the food, the amount of heat applied must be varied according to such food.

Basically, there are two ways to control the heat transferred from a heated surface to a foodstuff. One is by controlling the temperature of the surface of the heating element, i.e., by raising or lowering the temperature of the heating surface. The other is by controlling the period of time the material is exposed to the heated surface. In other words, by moving the particle of food relative to the heating surface.

According to the present invention, mixing device 10 includes control means which regulate the speed of the mixing blade 42 and the temperature of heating element 50. As set forth above, motor 30 which drives mixing blades 42 has an "IDLE" setting, a low speed setting, a medium speed setting and a high speed setting, designated "L," "M" and "H," respectively. Likewise, heating element 50 has an "OFF" setting, a low temperature setting, a medium temperature setting and a high temperature setting, designated "L," "M" and "H," respectively. In the embodiment shown, motor 30 and its corresponding timing circuit 174 are designed such that motor 30 operates at approximately 2500 RPMs at the "IDLE" setting, 5000 RPMs at the "L" setting, 7500 RPMs at the "M" setting and 10000 RPMS at the "H" setting. Heating element 50 and its corresponding timing circuit 172 are designed such that heating element 50 operates at 0 watts at the "OFF" setting, and at approximately 300 watts at the "L" setting, 475 watts at the "M" setting and 650 watts at the "H" setting. With slide switches 102, 104, the speed of motor 30 and the temperature of heating element 50 are each independently settable to provide sixteen (16) separate temperature-to-speed combinations. Specifically, mixing device 10 may be set to operate at one (1) of four (4) temperature settings, one (1) of four (4) speed settings and any combination thereof. Each of the possible combinations of heater temperature and motor speed settings establishes a different rate of heat transfer from heating element 50 to the food to be warmed.

With slide switches 102, 104 set at desired levels, switch actuator 150 is pressed to actuate switch 170 which in turn cases motor 30 to operate at the selected speed and provides the selected level of power to heating element 50. Illuminating diode 188 provides an indication that heating element 50 is operating. Importantly, according to the present invention, slide switch 104 which controls motor 30 does not have an "OFF" position, and therefor motor 30 is always running whenever switch actuator 150 is pressed. In this respect, this arrangement ensures that motor 30 is operating whenever power is provided to heating element 50. This feature reduces the likelihood of heating element 50 overheating, which could occur if heating element 50 is immersed in a liquid which remains stationary relative thereto.

At the high temperature/"IDLE" speed setting, high heat transfer occurs between the surface of heating element 50 and a stationary particle of the food adjacent thereto. In this respect, a particle of food is exposed to the heated surface for a prolonged period of time as it remains generally stationary relative to the surface of heating element 50. As will be appreciated, the possibility of burning or scorching food is greater at a high temperature/"IDLE" speed setting, than when mixing device 10 is set to operate at a high temperature/high speed. At the latter setting, a particle of food is exposed to the same heated surface, but for a shorter period of time, the increased blade speed causing the individual food particles to move more rapidly over, past and away from the surface of heating element 50. Thus, the overall heat transferred to the particle of food is reduced by reducing the time the particle of food is exposed to the surface of heating element 50. Further a low temperature/low speed setting, the heat transferred to a food particle is even less, as the particle is exposed to a relatively cooler heating surface, and, therefore, the likelihood of burning the food is further reduced. Finally, a low temperature/high speed setting transfers the least amount of heat to the food particles.

An appliance according to the present invention thus provides a range of heat transfer settings to facilitate blending and heating a wide range of foods which may have different consistency. Extremely thick foodstuffs, such as milk-based sauces may be blended at a low temperature/high speed setting to ensure that the heat transferred from the surface of heating element 50 to a particle of the sauce is not so high as to burn or scorch the food which would cause a deposit buildup on heating element 50. On the other hand, water-based foods, such as broth, may be blended and heated at high temperature/high speed without the likelihood of burning or scorching the food. Thus, by controlling the instantaneous heat transfer from surface 56 of heating element 50 to a particle of the food adjacent such surface, the likelihood of burning same may be :reduced.

In addition to the slide switch control means set forth above, mixing device 10 further includes thermostat 70 on heating element 50 to eliminate power to heating element 50 if the surface temperature of heating element 50 has reached a predetermined temperature. According to the present invention, thermostat 70 is preferably set to shut off the current when the temperature of the liquid approaches the boiling temperature of water.

As best seen in FIG. 4B, with guard 28 fixed thereon, mixing device 10 can be stood upright on a countertop with heating element 50 spaced from the surface of the counter. Importantly, as indicated above, according to the present invention, pin 44 on shaft 32 extends below the lower surface of heating element 50 and flared portion 26c of lower housing section 26 has an outer diameter greater than the diameter of the loop formed by heating element 50. In this respect, mixing device cannot be stood upright or rest on its side on heating element 50. This feature prevents the possibility of a hot heating element 50 resting in contact with a counter top or table surface.

The present invention thus provides means for controlling the surface temperature of the heating element and the speed of the blade in order to vary the heat transfer parameters of the device to accommodate the food to be mixed or blended. Further, the present invention substantially reduces the likelihood of burning of the foodstuff by providing multiple speed controls and multiple temperature settings which enable a user to maximize the heat transfer and minimize the likelihood of scorching or burning the food. Still further, the present invention provides a safety feature, namely thermostat 70, to further reduce the likelihood of burning and scorching.

The present invention has been described with respect to a preferred embodiment. Modifications and alterations will occur to those skilled in the art upon a reading and an understanding of the specification. For example, although the apparatus shown includes a single heating coil 50 surrounding blade 42, multiple coils may be provided to define a mixing chamber about blade 42 without deviating from the present invention. It is intended that all such modifications and alterations be included as so far as they come within the scope of the claims or the equivalents thereof.

Thus, having described the invention, the following is claimed:

1. A hand-held mixing device comprising:
    an electric motor;
    an elongated shaft extending from said motor;
    a housing enclosing said motor and a major portion of said shaft;
    a blade at the free end of said shaft;
    a heating element extending from said housing, having at least one coil surrounding said blade; and
    circuit means for connecting said motor and said heating element to an electrical power source, said circuit means including heating element switch means having multiple switch settings for establishing multiple operating conditions for said heating element, motor switch means having multiple motor switch settings for establishing multiple operating conditions for said motor and master switch means enabling said motor and heating element.

2. A hand-held mixing device as defined in claim 1 wherein said heating element switch means is a four position slide switch, one of said four positions being an "off" position.

3. A hand-held mixing device as defined in claim 1 wherein said motor switch means is a four position slide switch for establishing four separate and distinct blade speeds.

4. A hand-held device as defined in claims 2 or 3 further comprising thermostat means adjacent said heating element for limiting the temperature of said heating element.

5. A hand-held mixing device as defined in claim 1 wherein said housing is comprised of a first upper housing section, a second upper housing section, and a lower housing section, said first and second upper housing sections containing said motor and said circuit means.

6. A hand-held mixing device as defined in claim 5 wherein said upper housing sections include surface means for snap-lock connection to said lower housing section.

7. A hand-held mixing device as defined in claim 1 wherein said heating element switch means is a four position switch having a first "off" position, a second position to establish a low heat level, a third position to establish a moderate heat level, and a fourth position to establish a high heat level.

8. A hand-held mixing device as defined in claim 1 wherein said motor switch means is a four position switch having a first "idle" position to establish an idle speed, a second position to establish a low speed, a third position to establish a moderate speed, and a fourth position to establish a high speed.

9. A hand-held mixing device as defined in claim 1 wherein said motor switch settings establish a range of speeds of said motor including 2,500 revolutions per minute to 10,000 revolutions per minute.

10. A hand-held mixing device as defined in claim 1 wherein said motor switch settings establish a range of speeds of said motor including 5,000 revolutions per minute to 7,500 revolutions per minute.

11. A hand-held mixing device comprising:
a first upper housing section;
a second upper housing section attachable to said first upper housing section;
an electric motor disposed between said upper housing sections;
a generally tubular lower housing section having an open upper end and an open lower end, said lower housing section being attachable to said first and second upper housing sections;
an elongated shaft extending through said lower housing section connected to said motor;
a blade at the free end of said shaft;
a heating element;
mounting means for mounting said shaft and said heating element to said open lower end of said lower housing section with said blade and said heating element extending therefrom, said mounting means forming a fluid-tight seal between said lower housing section and said shaft and between said lower housing section and said heating element wherein said lower housing section is immersible in fluids; and
circuit means connectable to an electrical power source for controlling said heating element and said motor, said circuit means including switch means for independently varying the speed of said motor and the temperature of said heating element.

12. A hand-held mixing device as defined in claim 11 wherein said upper housing sections are received in the open upper end of said lower housing section and are secured therein by surface members on said upper housing sections engaging surface members on said lower housing section.

13. A hand-held mixing device as defined in claim 11 wherein said switch means includes heating element switch means having multiple switch settings, motor switch means having multiple switch settings and master switch means enabling said heating element and motor.

14. A hand-held mixing device as defined in claim 13 wherein said heating element switch means and said motor switch means are multiposition slide switches.

15. A hand-held mixing device as defined in claim 11 wherein said mounting means includes a plate and a bearing mounted thereon, said shaft extending through said bearing and said heating element extending through said plate.

16. A hand-held mixing device comprised of an upper assembly and a lower assembly, said lower assembly including:
a lower housing section;
a shaft having a motor end and a free end;
a blade at the free end of said shaft;
first circuit means including a heating element;
means for mounting said shaft and said heating element to said lower housing section to form a fluid-tight assembly with said blade and said heating element being external to said lower housing section, said upper assembly including:
first and second housing sections;
second circuit means within said first and second housing sections connectable to said first circuit means;
said second circuit means being connectable to an external power source and including a motor, motor switch means having multiple switch settings establishing multiple motor operating conditions, heating element switch means having multiple switch settings establishing multiple heating element operating conditions, and actuator switch means enabling said heating element and said motor.

17. A hand-held mixing device as defined in claim 16 wherein said upper assembly is secured to said lower assembly by surface members on said upper assembly engaging surface members on said lower assembly.

18. A hand-held mixing device as defined in claim 17 wherein said motor includes coupling means dimensioned to receive said motor end of said shaft when said upper assembly is secured to said lower assembly.

19. A hand-held mixing device as defined in claim 16 wherein said heating element switch means and said motor switch means are multiposition slide switches.

20. A hand-held mixing device as defined in claim 16 wherein each of said multiple settings of said motor switch means causes said motor to be operable whenever said actuator switch means is actuated.

21. A hand-held mixing device comprising:
an electric motor;
an elongated shaft extending from said motor;
a housing enclosing said motor and a major portion of said shaft;
a blade at the free end of said shaft;
a heating element extending from said housing adjacent to said shaft;
circuit means for connecting said motor and said heating element to an electrical power source, said circuit means including selector means for establishing an operating condition comprised of a combination of one of a plurality of conditions for said heating element and one of a plurality of conditions for said motor; wherein said plurality of conditions for said motor are motor speeds greater than zero revolutions per minute.

22. A hand-held mixing device as defined in claim 21, wherein said selector means comprises a heating element switch having at least one switch setting, and a motor speed switch having at least one switch setting.

23. A hand-held mixing device as defined in claim 22, wherein said housing is comprised of:
a first upper housing section;
a second upper housing section attachable to said first upper housing selection; and
a generally tubular lower housing section, wherein said upper housing sections include surface means for snap-lock connection to said lower housing section.

24. A hand-held mixing device as defined in claim 23, wherein said first and second upper housing sections contain said motor and said circuit means.

25. A hand-held mixing device as defined in claim 24, wherein said circuit means further comprises a master switch means for enabling said motor and said heating element.

26. A hand-held mixing device comprising:
an electric motor;
an elongated shaft extending from said motor;
a housing comprised of an upper housing section and a lower housing section, said housing enclosing said motor and a major portion of said shaft;
a blade at the free end of said shaft;

a heating element adjacent said blade;

circuit means for connecting said motor and said heating element to an electrical power source, said circuit means including a multiple position motor slide switch for establishing a plurality of motor speeds, a multiple position heating element slide switch for establishing a plurality of operating temperatures for said heating element, and a master switch for enabling said motor and heating element, said motor slide switch and said heating element slide switch located within the upper housing section for operation by an operator's thumb, and said master switch located within the upper housing section for operation by one or more of the operator's fingers.

* * * * *